7281X Jervis & Trenchs.
Paper Polishing Mach.
No. Patented Nov. 6, 1832.
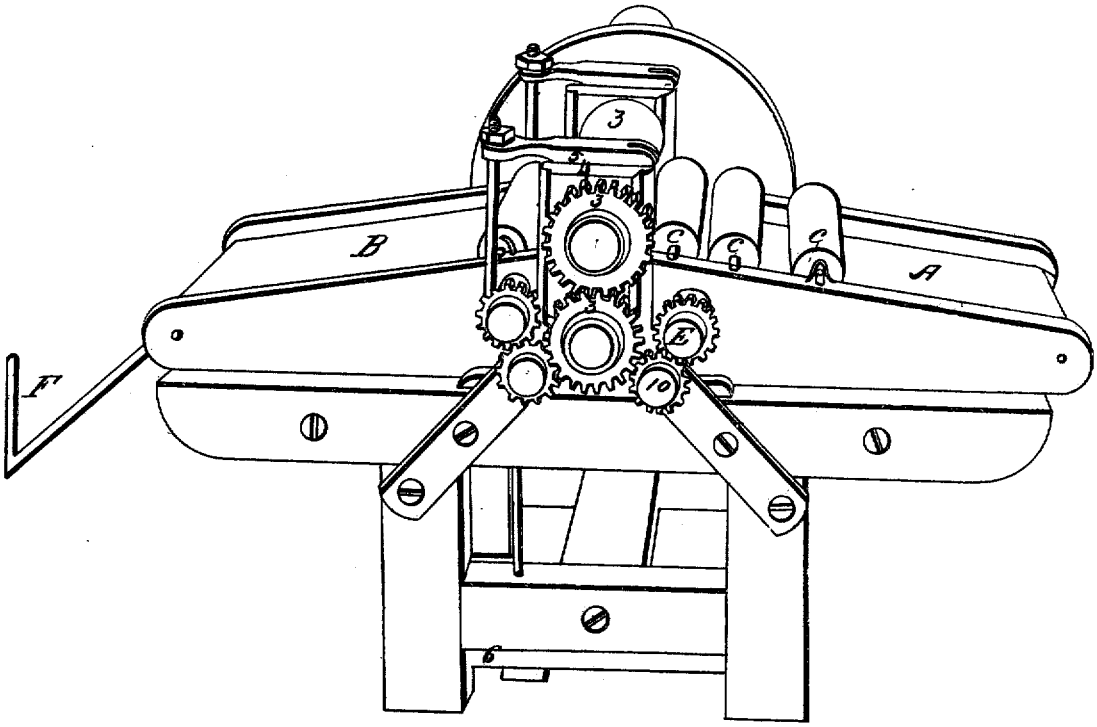
N. PETERS, PHOTO-LITHOGRAPHER, WASHINGTON, D. C.

X7281 Nov. 6. 1832

Asahel H. Jarvis and Thos French. Ithaca N York

Letters Patent

The Schedule referred to in these Letters Patent and making part of the same containing a description in the words of the said Asahel H. Jarvis & Thomas French themselves of their improvement in the "machine for pressing Paper called the "cylinder Hot or cold Press"

To all to whom these presents shall come

Be it known that We Asahel H. Jarvis & Thomas French both of Ithaca in the County of Tompkins and State of New York. have invented a new and useful improvement in the art of Paper making and that the following is a full and exact description of the construction and operation of said machine as invented or improved by us. The use and object of this machine which We have designated by the name of the "Cylinder hot or cold Press" are to press the paper after it is sized and dried & also paper after it is printed obviating the necessity & labour of pressing each sheet between two press papers. and by placing heated cast metal plates between every two or three pieces of paper and press papers. which has been the former mode of pressing paper by hand.

The machine consists of two or more cylinders 24 inches long between shoulders and six inches in diameter represented in the annexed drawing, formed of wrought or cast metal, either iron brass copper or composition turned and polished in the most perfect manner and cast or wrought hollow that they may be heated by water or by steam. These two cylinders are placed one directly above the other and are geared [illegible] or banded so that the surfaces will move the same. The box (4) of the under cylinder is placed stationary. The upper cylinder is weighted down on the under one by a lever (5) crossing over the upper box (4) to the end of which a rod is fastened. The rod is attached to a lever (6) below and has a box at the end containing weights to make the pressure between the cylinders by which the paper is pressed. The feeding table A revolves around two rollers B which are geared from the cylinders by an intermediate wheel (10) so as to carry the sheet of paper something slower than the

X7281 surface of the cylinder moves which carries the paper under four Rollers C & keeps the sheet perfectly smooth when entering the pressing cylinders (3) thence on the receiving Table B which revolves around two Rollers which are geared from the cylinder by an intermediate wheel so as to carry the sheet faster than the surface of the cylinder moves into a box E. — The machine is placed so as to give the cylinders from twelve to sixty revolutions per minute.
The sheet is placed on the feeding table A and passes under four Rollers (C) which keeps it smooth when entering the pressing cylinders 3. thence on a delivering table (B) which carries the sheets into a box E when they can be removed as occasion requires — The foregoing is a description as to dimensions of the "cylinder hot and cold press" now operating in the fall creek paper mill Ithaca & which presses from twenty to thirty reams per day .... It is propelled with gearing and belts attached to the Water Wheel shaft.
If the cylinders are turned and polished perfectly round and smooth it will obviate the necessity of pressing paper in the usual manner and thus save a very great item of labour and expense in finishing paper
It will also greatly improve the quality of paper both in body & surface Witnesses
C. F. Woodruff
Eben Mack Ashel McFarris
Thomas French 644 [illegible]